(12) United States Patent
Yu et al.

(10) Patent No.: US 10,949,061 B2
(45) Date of Patent: Mar. 16, 2021

(54) APPLICATION PUBLISHING IN A VIRTUALIZED ENVIRONMENT

(71) Applicant: Citrix Systems, Inc., Fort Lauderdale, FL (US)

(72) Inventors: Yedong Yu, Nanjing (CN); Yajun Yao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/259,598

(22) Filed: Jan. 28, 2019

(65) Prior Publication Data

US 2020/0218429 A1 Jul. 9, 2020

Related U.S. Application Data

(63) Continuation of application No. PCT/CN2019/070409, filed on Jan. 4, 2019.

(51) Int. Cl.
| | |
|---|---|
| *G06F 3/0486* | (2013.01) |
| *G06F 3/0482* | (2013.01) |
| *G06F 3/0481* | (2013.01) |
| *G06F 16/16* | (2019.01) |
| *G06F 16/955* | (2019.01) |

(52) U.S. Cl.
CPC ........ *G06F 3/04817* (2013.01); *G06F 3/0482* (2013.01); *G06F 3/0486* (2013.01); *G06F 16/164* (2019.01); *G06F 16/9558* (2019.01)

(58) Field of Classification Search
CPC ..... G06F 3/048; G06F 16/164; G06F 16/9558
See application file for complete search history.

(56) References Cited

U.S. PATENT DOCUMENTS

| | | | |
|---|---|---|---|
| 8,977,964 | B2 | 3/2015 | Barraclough et al. |
| 9,292,323 | B2 | 3/2016 | Suresh et al. |
| 2012/0317482 | A1 | 12/2012 | Barraclough et al. |
| 2014/0344806 | A1 | 11/2014 | Suresh et al. |
| 2015/0199313 | A1 | 7/2015 | Barraclough et al. |

(Continued)

FOREIGN PATENT DOCUMENTS

| | | |
|---|---|---|
| CN | 103177014 A | 6/2013 |
| CN | 105592114 A | 5/2016 |

(Continued)

OTHER PUBLICATIONS

Sep. 30, 2019—Notification of Transmittal of ISR an WO—International Application No. PCT/CN2019/070409.

(Continued)

*Primary Examiner* — Xuyang Xia
(74) *Attorney, Agent, or Firm* — Banner & Witcoff, Ltd.

(57) ABSTRACT

Methods and systems for application publishing in a virtualized environment are described herein. A system may facilitate publishing of one or more shortcuts based on inputs made in the virtual desktop environment (e.g., when a user "drag-and-drops" a shortcut onto a publishing icon on a desktop). The system may determine application information and instance information for the application, and may publish a shortcut for that application to the storefront. As a result, users may be permitted to self-publish shortcuts for preferred applications onto personalized storefronts, which may be unique to each user.

17 Claims, 8 Drawing Sheets

(56) References Cited

U.S. PATENT DOCUMENTS

| | | | |
|---|---|---|---|
| 2016/0085514 A1* | 3/2016 | Savliwala | G06F 3/0482 705/14.69 |
| 2016/0112497 A1* | 4/2016 | Koushik | H04L 67/10 726/7 |
| 2017/0364235 A1* | 12/2017 | Venkatesh | H04L 67/1095 |
| 2017/0371509 A1* | 12/2017 | Jung | G06F 3/04817 |

FOREIGN PATENT DOCUMENTS

| | | |
|---|---|---|
| CN | 103177014 B | 4/2018 |
| CN | 108255683 A | 7/2018 |
| EP | 2997466 A1 | 3/2016 |
| WO | 2014186451 A1 | 11/2014 |
| WO | 2018120905 A1 | 7/2018 |

OTHER PUBLICATIONS

Sep. 30, 2019—Written Opinion of the International Searching Authority—International Application No. PCT/CN2019/070409.

Sep. 30, 2019—International Search Report—International Application No. PCT/CN2019/070409.

\* cited by examiner

APPLICATION PUBLISHING IN A VIRTUALIZED ENVIRONMENT

FIELD

Aspects described herein generally relate to computers and computer networks. In particular, aspects described herein relate to virtualized environments for computer software, computer architecture, computing protocols, and the like.

BACKGROUND

Virtualized environments allow users to remotely access numerous programs and services. However, users may be required to execute several steps in order to launch a given application in a remote environment. Better systems and methods for accessing and managing virtualized applications are needed.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards application publishing in a virtualized environment. A virtualized environment may comprise a virtualization system implementing one or more virtual desktops, such that, for example, each virtual desktop may perform one or more application functions of a plurality of application functions required to perform one or more tasks. A virtualization system may comprise one or more components, such as a receiver, a computing device implementing a receiver, a storefront, a virtual desktop, or one or more servers implementing a storefront and/or virtual desktop. A virtualization system may receive a user input corresponding to an application on a virtual desktop. The virtualization system may determine that an icon has been repositioned over a shortcut icon in order to indicate that a shortcut is desired for publishing on a storefront. A storefront may comprise a list of links to applications and/or virtual desktops. A plurality of those links may each correspond to one of a plurality of virtual desktops. The virtualization system may transmit information comprising application information and instance information for the virtual desktop. The application information may comprise information identifying the application, such as a path name, application identifier, an application icon etc. The application information may be derived from a local shortcut on the virtual desktop (e.g., path name and icon information in a Windows shortcut). The instance information may comprise information identifying a virtual desktop, such as an internet protocol address, a media access control address, a virtual desktop identifier, etc. The identified virtual desktop may be one of the plurality of virtual desktops. The virtualization system may publish, based on the information, a shortcut to the application on a storefront. After receiving a selection of the shortcut on the storefront, the virtualization system may launch an instance of the application. The virtualization system may track how often shortcuts for the application are made, and may determine when a number of published shortcuts for an application (or an application type which may correspond to general instances of the application) are installed. If the number exceeds a threshold, the virtualization system may publish one or more other shortcuts to one or more other storefronts (e.g., one or more other storefronts for one or more other users).

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards application publishing in a virtualized environment. A system, such as a virtualization system, may enable a user to access a shortcut on a storefront in order to launch an instance of an application on a virtual desktop. In order to facilitate creation of one or more shortcuts, the system may detect when an application on a virtual desktop has been selected for publishing as a shortcut (e.g., when a user "drag-and-drops" a shortcut onto a publishing icon on a desktop). The system may determine application information and instance information for the application, and may publish a shortcut for that application to the storefront. Then, when a user selects the application shortcut published on the storefront, the system may launch the application. As a result, users may be permitted to self-publish shortcuts for preferred applications onto personalized storefronts, which may be unique to each user.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
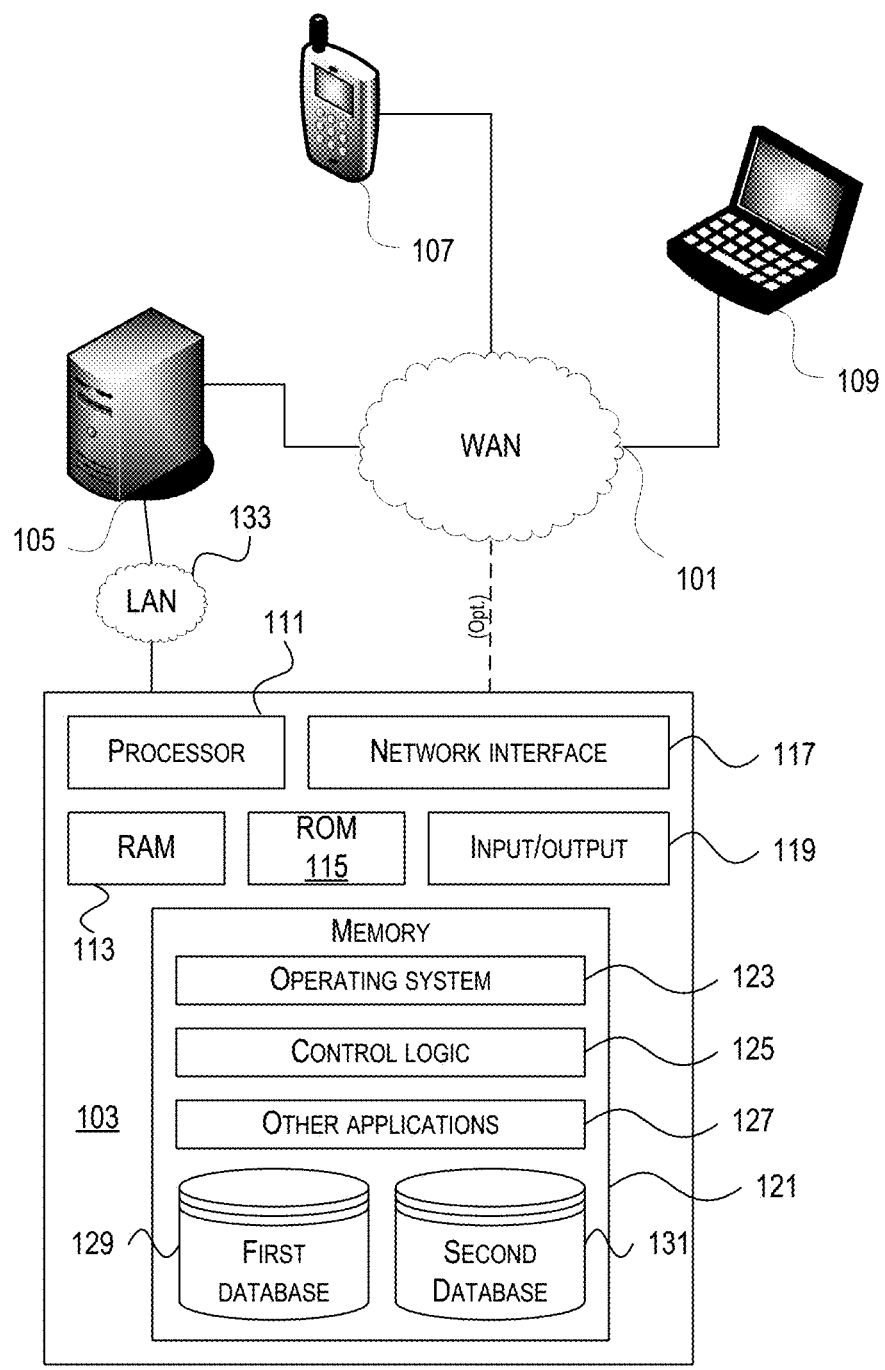
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
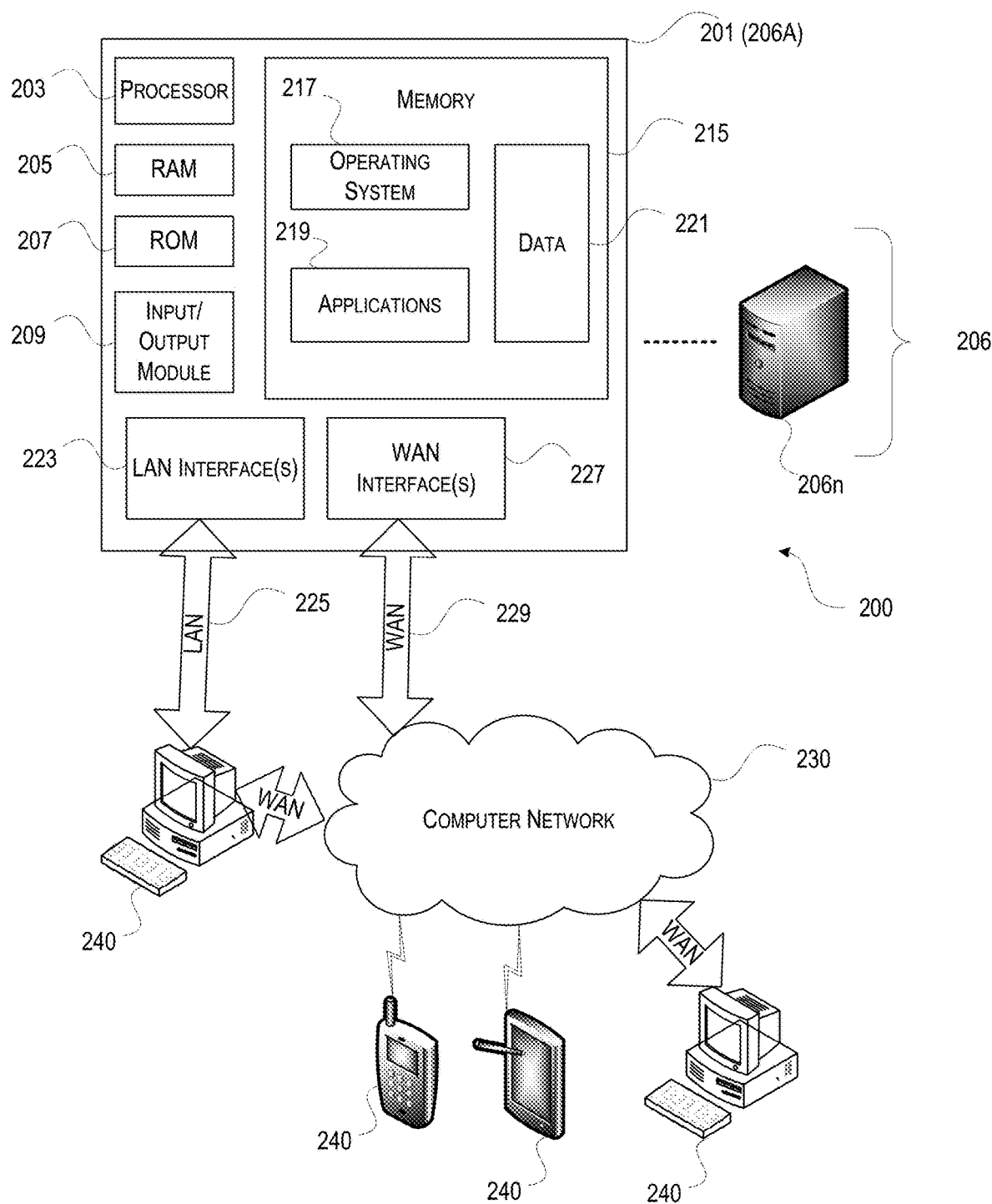
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
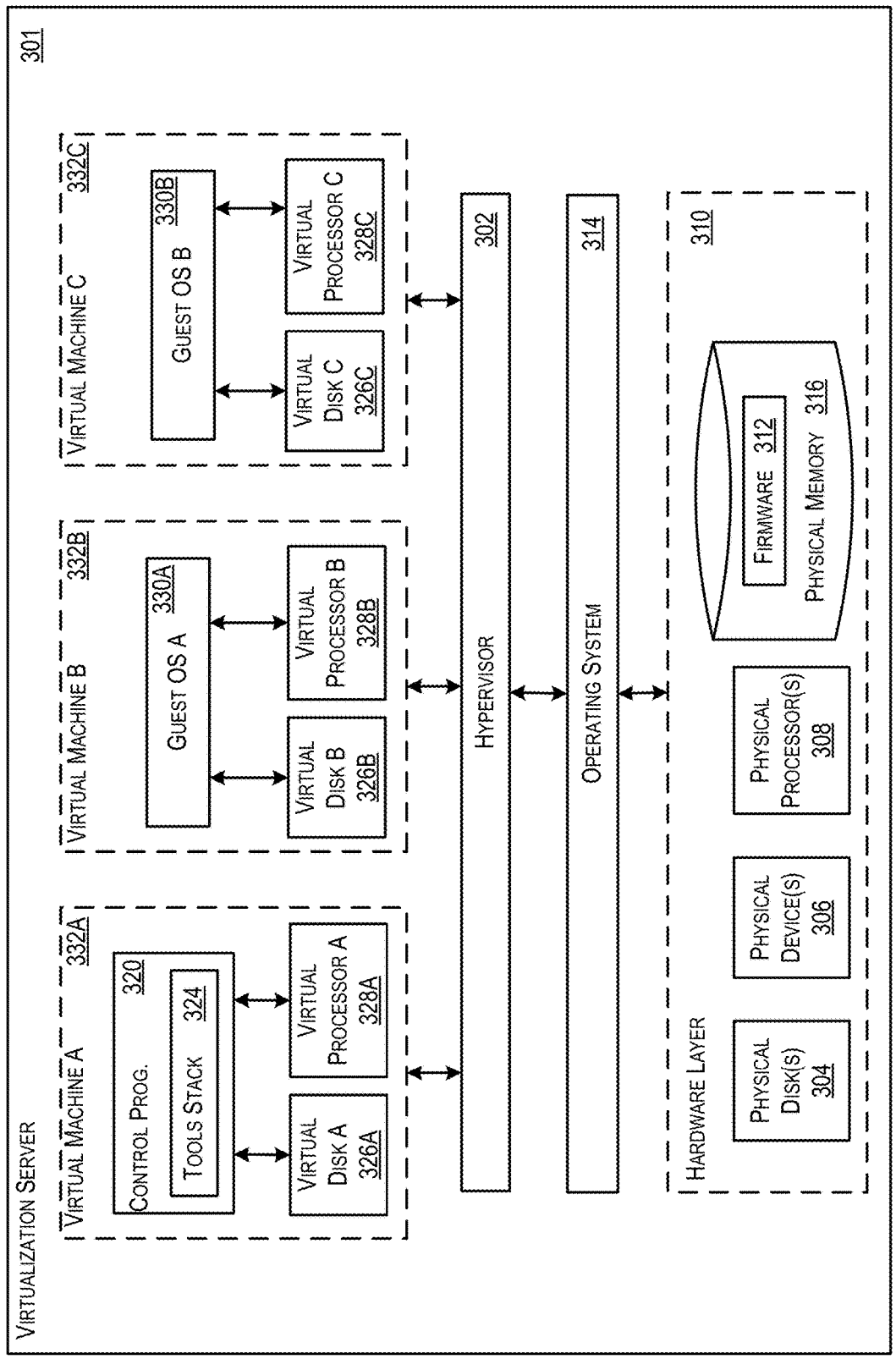
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Enterprise Mobility Management Architecture

Figure 4:
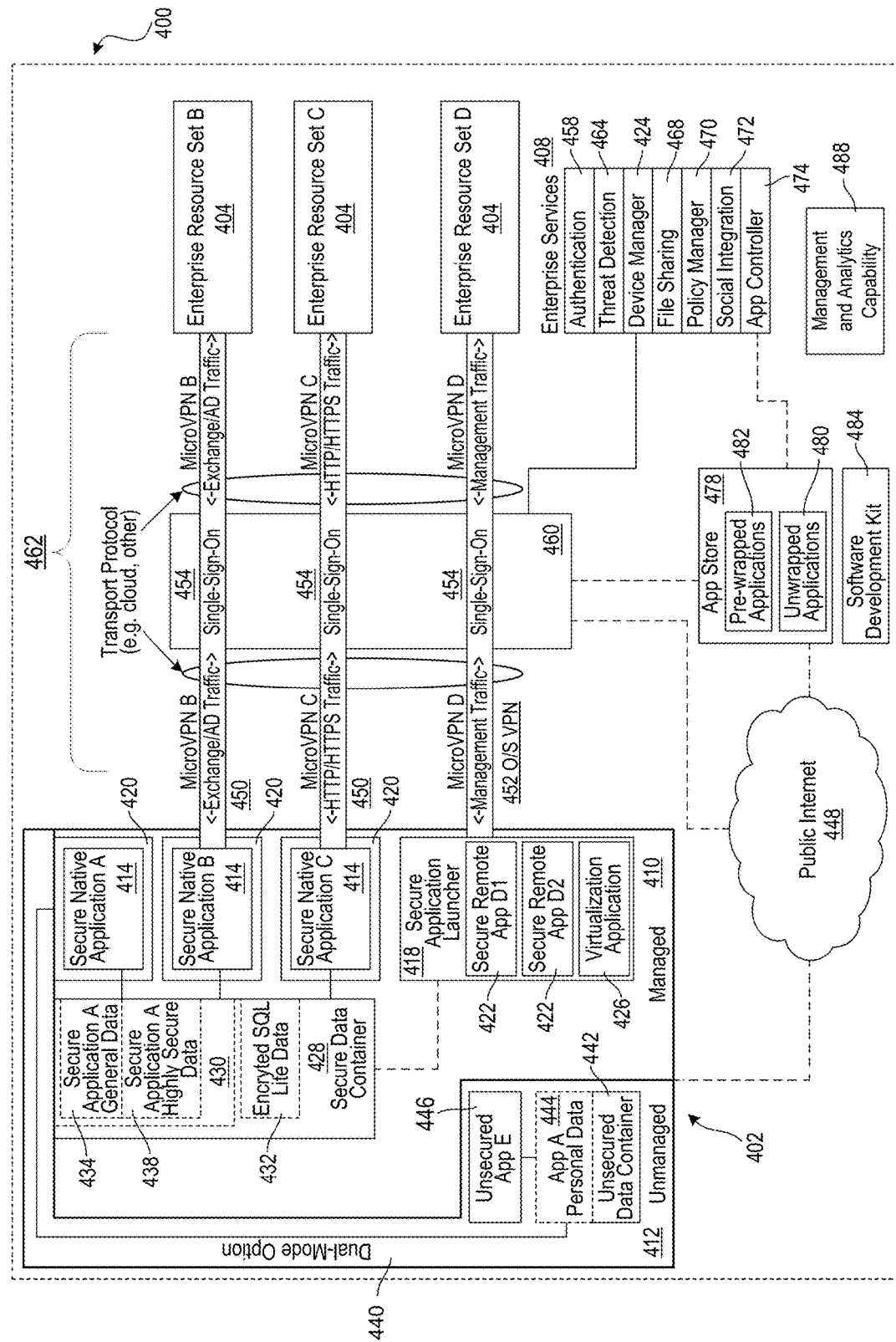
FIG. 4 depicts an illustrative enterprise mobility management system.

FIG. 4 represents an enterprise mobility technical architecture 400 for use in a "Bring Your Own Device" (BYOD) environment. The architecture enables a user of a mobile device 402 to both access enterprise or personal resources from a mobile device 402 and use the mobile device 402 for personal use. The user may access such enterprise resources 404 or enterprise services 408 using a mobile device 402 that is purchased by the user or a mobile device 402 that is provided by the enterprise to the user. The user may utilize the mobile device 402 for business use only or for business and personal use. The mobile device 402 may run an iOS operating system, an Android operating system, or the like. The enterprise may choose to implement policies to manage the mobile device 402. The policies may be implemented through a firewall or gateway in such a way that the mobile device 402 may be identified, secured or security verified, and provided selective or full access to the enterprise resources (e.g., 404 and 408.) The policies may be mobile device management policies, mobile application management policies, mobile data management policies, or some combination of mobile device, application, and data management policies. A mobile device 402 that is managed through the application of mobile device management policies may be referred to as an enrolled device.

In some embodiments, the operating system of the mobile device 402 may be separated into a managed partition 410 and an unmanaged partition 412. The managed partition 410 may have policies applied to it to secure the applications running on and data stored in the managed partition 410. The applications running on the managed partition 410 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 402. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 414, secure remote applications 422 executed by a secure application launcher 418, virtualization applications 426 executed by a secure application launcher 418, and the like. The secure native applications 414 may be wrapped by a secure application wrapper 420. The secure application wrapper 420 may include integrated policies that are executed on the mobile device 402 when the secure native application 414 is executed on the mobile device 402. The secure application wrapper 420 may include meta-data that points the secure native application 414 running on the mobile device 402 to the resources hosted at the enterprise (e.g., 404 and 408) that the secure native application 414 may require to complete the task requested upon execution of the secure native application 414. The secure remote applications 422 executed by a secure application launcher 418 may be executed within the secure application launcher 418. The virtualization applications 426 executed by a secure application launcher 418 may utilize resources on the mobile device 402, at the enterprise resources 404, and the like. The resources used on the mobile device 402 by the virtualization applications 426 executed by a secure application launcher 418 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 404, and the like. The resources used at the enterprise resources 404 by the virtualization applications 426 executed by a secure application launcher 418 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 426 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 402, this arrangement may also be elected for certain applications. For example, while some applications may be secured for use on the mobile device 402, others might not be prepared or appropriate for deployment on the mobile device 402 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 402 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 402 as well as a virtualization application 426 to allow access to applications that are deemed more properly operated on the server side. In an embodiment, the virtualization application 426 may store some data, files, etc. on the mobile device 402 in one of the secure storage locations. An enterprise, for example, may elect to allow certain information to be stored on the mobile device 402 while not permitting other information.

In connection with the virtualization application 426, as described herein, the mobile device 402 may have a virtualization application 426 that is designed to present GUIs and then record user interactions with the GUI. The virtualization application 426 may communicate the user interactions to the server side to be used by the server side application as user interactions with the application. In response, the application on the server side may transmit back to the mobile device 402 a new GUI. For example, the new GUI may be a static page, a dynamic page, an animation, or the like, thereby providing access to remotely located resources.

The secure applications 414 may access data stored in a secure data container 428 in the managed partition 410 of the mobile device 402. The data secured in the secure data container may be accessed by the secure native applications 414, secure remote applications 422 executed by a secure application launcher 418, virtualization applications 426 executed by a secure application launcher 418, and the like. The data stored in the secure data container 428 may include files, databases, and the like. The data stored in the secure data container 428 may include data restricted to a specific secure application 430, shared among secure applications 432, and the like. Data restricted to a secure application may include secure general data 434 and highly secure data 438. Secure general data may use a strong form of encryption such as Advanced Encryption Standard (AES) 128-bit encryption or the like, while highly secure data 438 may use a very strong form of encryption such as AES 256-bit encryption. Data stored in the secure data container 428 may be deleted from the mobile device 402 upon receipt of a command from the device manager 424. The secure applications (e.g., 414, 422, and 426) may have a dual-mode option 440. The dual mode option 440 may present the user with an option to operate the secured application in an unsecured or unmanaged mode. In an unsecured or unmanaged mode, the secure applications may access data stored in an unsecured data container 442 on the unmanaged partition 412 of the mobile device 402. The data stored in an unsecured data container may be personal data 444. The data stored in an unsecured data container 442 may also be accessed by unsecured applications 446 that are running on the unmanaged partition 412 of the mobile device 402. The data stored in an unsecured data container 442 may remain on the mobile device 402 when the data stored in the secure data container 428 is deleted from the mobile device 402. An enterprise may want to delete from the mobile device 402 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 402 may connect to enterprise resources 404 and enterprise services 408 at an enterprise, to the public Internet 448, and the like. The mobile device 402 may connect to enterprise resources 404 and enterprise services 408 through virtual private network connections. The virtual private network connections, also referred to as microVPN or application-specific VPN, may be specific to particular applications (as illustrated by microVPNs 450, particular devices, particular secured areas on the mobile device (as illustrated by O/S VPN 452), and the like. For example, each of the wrapped applications in the secured area of the mobile device 402 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 454. The single-sign-on processes may allow a user to provide a single set of authentication credentials, which are then verified by an authentication service 458. The authentication service 458 may then grant to the user access to multiple enterprise resources 404, without requiring the user to provide authentication credentials to each individual enterprise resource 404.

The virtual private network connections may be established and managed by an access gateway 460. The access gateway 460 may include performance enhancement features that manage, accelerate, and improve the delivery of enterprise resources 404 to the mobile device 402. The access gateway 460 may also re-route traffic from the mobile device 402 to the public Internet 448, enabling the mobile device 402 to access publicly available and unsecured applications that run on the public Internet 448. The mobile device 402 may connect to the access gateway via a transport network 462. The transport network 462 may use one or more transport protocols and may be a wired network, wireless network, cloud network, local area network, metropolitan area network, wide area network, public network, private network, and the like.

The enterprise resources 404 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 404 may be premise-based resources, cloud-based resources, and the like. The enterprise resources 404 may be accessed by the mobile device 402 directly or through the access gateway 460. The enterprise resources 404 may be accessed by the mobile device 402 via the transport network 462.

The enterprise services 408 may include authentication services 458, threat detection services 464, device manager services 424, file sharing services 468, policy manager services 470, social integration services 472, application controller services 474, and the like. Authentication services 458 may include user authentication services, device authentication services, application authentication services, data authentication services, and the like. Authentication services 458 may use certificates. The certificates may be stored on the mobile device 402, by the enterprise resources 404, and the like. The certificates stored on the mobile device 402 may be stored in an encrypted location on the mobile device 402, the certificate may be temporarily stored on the mobile device 402 for use at the time of authentication, and the like. Threat detection services 464 may include intrusion detection services, unauthorized access attempt detection services, and the like. Unauthorized access attempt detection services may include unauthorized attempts to access devices, applications, data, and the like. Device management services 424 may include configuration, provisioning, security, support, monitoring, reporting, and decommissioning services. File sharing services 468 may include file management services, file storage services, file collaboration services, and the like. Policy manager services 470 may include device policy manager services, application policy manager services, data policy manager services, and the like. Social integration services 472 may include contact integration services, collaboration services, integration with social networks such as Facebook, Twitter, and LinkedIn, and the like. Application controller services 474 may include management services, provisioning services, deployment services, assignment services, revocation services, wrapping services, and the like.

The enterprise mobility technical architecture 400 may include an application store 478. The application store 478 may include unwrapped applications 480, pre-wrapped applications 482, and the like. Applications may be populated in the application store 478 from the application controller 474. The application store 478 may be accessed by the mobile device 402 through the access gateway 460, through the public Internet 448, or the like. The application store 478 may be provided with an intuitive and easy to use user interface.

A software development kit 484 may provide a user the capability to secure applications selected by the user by wrapping the application as described previously in this description. An application that has been wrapped using the software development kit 484 may then be made available to the mobile device 402 by populating it in the application store 478 using the application controller 474.

The enterprise mobility technical architecture 400 may include a management and analytics capability 488. The management and analytics capability 488 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 5:
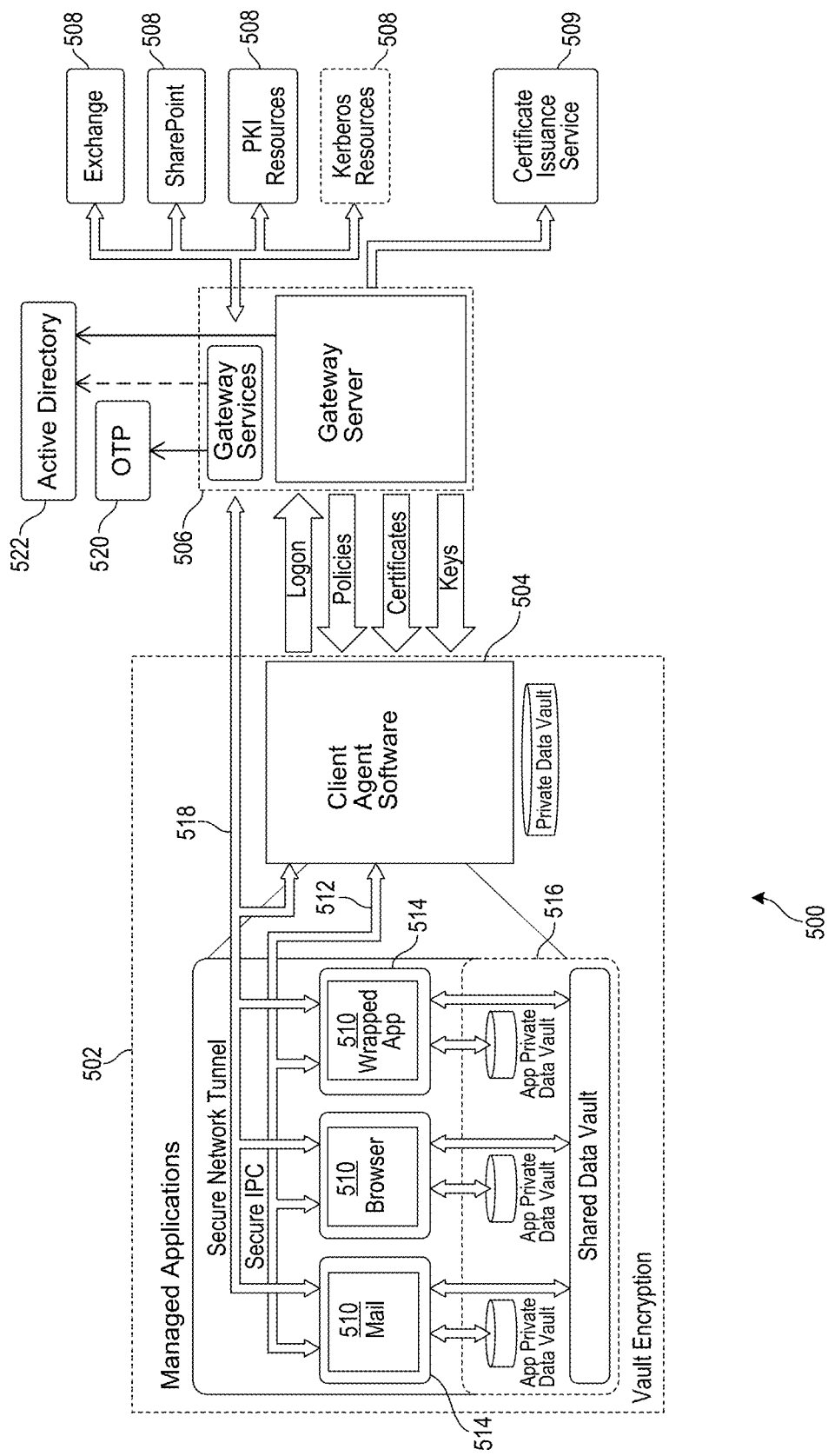
FIG. 5 depicts another illustrative enterprise mobility management system.

FIG. 5 is another illustrative enterprise mobility management system 500. Some of the components of the mobility management system 400 described above with reference to FIG. 4 have been omitted for the sake of simplicity. The architecture of the system 500 depicted in FIG. 5 is similar in many respects to the architecture of the system 400 described above with reference to FIG. 4 and may include additional features not mentioned above.

In this case, the left hand side represents an enrolled mobile device 502 with a client agent 504, which interacts with gateway server 506 (which includes Access Gateway and application controller functionality) to access various enterprise resources 508 and services 509 such as Exchange, Sharepoint, public-key infrastructure (PKI) Resources, Kerberos Resources, Certificate Issuance service, as shown on the right hand side above. Although not specifically shown, the mobile device 502 may also interact with an enterprise application store (StoreFront) for the selection and downloading of applications.

The client agent 504 acts as the UI (user interface) intermediary for Windows apps/desktops hosted in an Enterprise data center, which are accessed using the High-Definition User Experience (HDX)/ICA display remoting protocol. The client agent 504 also supports the installation and management of native applications on the mobile device 502, such as native iOS or Android applications. For example, the managed applications 510 (mail, browser, wrapped application) shown in the figure above are all native applications that execute locally on the mobile device 502. Client agent 504 and application management framework of this architecture act to provide policy driven management capabilities and features such as connectivity and SSO (single sign on) to enterprise resources/services 508. The client agent 504 handles primary user authentication to the enterprise, normally to Access Gateway (AG) 506 with SSO to other gateway server components. The client agent 504 obtains policies from gateway server 506 to control the behavior of the managed applications 510 on the mobile device 502.

The Secure InterProcess Communication (IPC) links 512 between the native applications 510 and client agent 504 represent a management channel, which may allow a client agent to supply policies to be enforced by the application management framework 514 "wrapping" each application. The IPC channel 512 may also allow client agent 504 to supply credential and authentication information that enables connectivity and SSO to enterprise resources 508. Finally, the IPC channel 512 may allow the application management framework 514 to invoke user interface functions implemented by client agent 504, such as online and offline authentication.

Communications between the client agent 504 and gateway server 506 are essentially an extension of the management channel from the application management framework 514 wrapping each native managed application 510. The application management framework 514 may request policy information from client agent 504, which in turn may request it from gateway server 506. The application management framework 514 may request authentication, and client agent 504 may log into the gateway services part of gateway server 506 (also known as NETSCALER ACCESS GATEWAY). Client agent 504 may also call supporting services on gateway server 506, which may produce input material to derive encryption keys for the local data vaults 516, or may provide client certificates which may enable direct authentication to PKI protected resources, as more fully explained below.

In more detail, the application management framework 514 "wraps" each managed application 510. This may be incorporated via an explicit build step, or via a post-build processing step. The application management framework 514 may "pair" with client agent 504 on first launch of an application 510 to initialize the Secure IPC channel 512 and obtain the policy for that application. The application management framework 514 may enforce relevant portions of the policy that apply locally, such as the client agent login dependencies and some of the containment policies that restrict how local OS services may be used, or how they may interact with the managed application 510.

The application management framework 514 may use services provided by client agent 504 over the Secure IPC channel 512 to facilitate authentication and internal network access. Key management for the private and shared data vaults 516 (containers) may be also managed by appropriate interactions between the managed applications 510 and client agent 504. Vaults 516 may be available only after online authentication, or may be made available after offline authentication if allowed by policy. First use of vaults 516 may require online authentication, and offline access may be limited to at most the policy refresh period before online authentication is again required.

Network access to internal resources may occur directly from individual managed applications 510 through Access Gateway 506. The application management framework 514 may be responsible for orchestrating the network access on behalf of each managed application 510. Client agent 504 may facilitate these network connections by providing suitable time limited secondary credentials obtained following online authentication. Multiple modes of network connection may be used, such as reverse web proxy connections and end-to-end VPN-style tunnels 518.

The Mail and Browser managed applications 510 have special status and may make use of facilities that might not be generally available to arbitrary wrapped applications. For example, the Mail application 510 may use a special background network access mechanism that allows it to access an Exchange server 508 over an extended period of time without requiring a full AG logon. The Browser application 510 may use multiple private data vaults 516 to segregate different kinds of data.

This architecture may support the incorporation of various other security features. For example, gateway server 506 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 506 may identify managed native applications 510 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 516 (containers) on the mobile device 502. The vaults 516 may be encrypted so that all on-device data including files, databases, and configurations are protected. For on-line vaults, the keys may be stored on the server (gateway server 506), and for off-line vaults, a local copy of the keys may be protected by a user password or biometric validation. If or when data is stored locally on the mobile device 502 in the secure container 516, it may be preferred that a minimum of AES 256 encryption algorithm be utilized.

Other secure container features may also be implemented. For example, a logging feature may be included, wherein security events happening inside a managed application 510 may be logged and reported to the backend. Data wiping may be supported, such as if or when the managed application 510 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 502 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 514 may be prevented in other ways. For example, if or when a managed application 510 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 520 without the use of an AD (active directory) 522 password for access to one or more applications. In some cases, some users do not know (or are not permitted to know) their AD password, so these users may authenticate using an OTP 520 such as by using a hardware OTP system like SecurID (OTPs may be provided by different vendors also, such as Entrust or Gemalto). In some cases, after a user authenticates with a user ID, a text may be sent to the user with an OTP 520. In some cases, this may be implemented only for online use, with a prompt being a single field.

An offline password may be implemented for offline authentication for those managed applications 510 for which offline use is permitted via enterprise policy. For example, an enterprise may want StoreFront to be accessed in this manner In this case, the client agent 504 may require the user to set a custom offline password and the AD password is not used. Gateway server 506 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 510 as secondary credentials (for the purpose of accessing PKI protected web resources via the application management framework micro VPN feature). For example, a managed application 510 may utilize such a certificate. In this case, certificate-based authentication using ActiveSync protocol may be supported, wherein a certificate from the client agent 504 may be retrieved by gateway server 506 and used in a keychain. Each managed application 510 may have one associated client certificate, identified by a label that is defined in gateway server 506.

Gateway server 506 may interact with an enterprise special purpose web service to support the issuance of client certificates to allow relevant managed applications to authenticate to internal PKI protected resources.

The client agent 504 and the application management framework 514 may be enhanced to support obtaining and using client certificates for authentication to internal PKI protected network resources. More than one certificate may be supported, such as to match various levels of security and/or separation requirements. The certificates may be used by the Mail and Browser managed applications 510, and ultimately by arbitrary wrapped applications 510 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 510 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 502 is authenticated to the enterprise, and vice versa. Virtual smart cards for authentication to gateway server 506 may also be implemented.

Both limited and full Kerberos support may be additional features. The full support feature relates to an ability to do full Kerberos login to Active Directory (AD) 522, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 510 is not running.

A multi-site architecture or configuration of enterprise application store and an application controller may be supported that allows users to be serviced from one of several different locations in case of failure.

In some cases, managed applications 510 may be allowed to access a certificate and private key via an API (for example, OpenSSL). Trusted managed applications 510 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Virtual Desktop Application Self-Publishing

Figure 6:
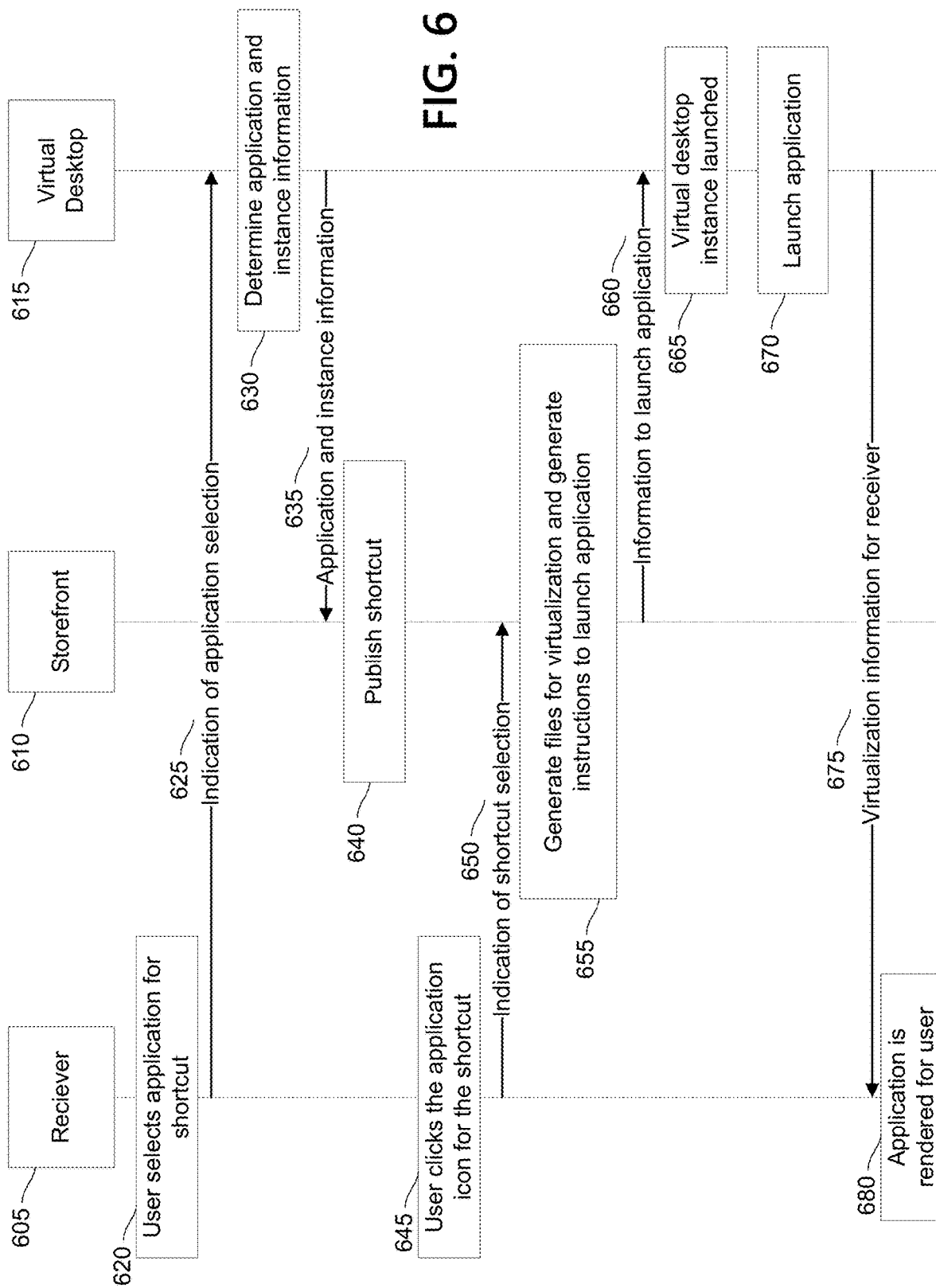
FIG. 6 depicts an illustrative example of a message flow for publishing an application on a storefront.

FIG. 6 depicts an illustrative example of a message flow for publishing an application on a storefront 610 (e.g., an application store 478 or a StoreFront as discussed in FIG. 5). One or more storefronts may comprise shortcuts to launch one or more applications, which may be populated via a centralized publishing source (e.g., an application controller 474). However, it may be beneficial for the system to permit a user to self-publish an application to a storefront from a virtual desktop 615 (e.g., a user may wish to add a shortcut for an application installed on a virtual desktop to a storefront). The virtual desktop 615 may be a computing device 201. The system may enable a virtual desktop 615 to recognize that a shortcut is desired based on inputs at a receiver 605, and transmit information (e.g., an application path and/or application icon) to the storefront 610 for the storefront to publish the application.

Client agent software, such as client agent software 504, may be rendered on a user machine using the receiver 605. The receiver 605 may comprise software capable of rendering a virtual desktop 615 for display and interaction on a local device (e.g., a Windows computer, a Macintosh computer, an Android device, an iOS device, a Linux computer, or any other suitable rendering platform). The receiver 605 may be a client device 240 executing a virtual machine receiver program. In some instances, the receiver 605 may comprise software for locally rendering of the virtual desktop 615, as well as interface software that allows for a user to interact with the virtual desktop 615.

At step 620, the receiver 605 may receive an indication that a user selects an application for a shortcut. A user may select an application for a shortcut in numerous ways. In one example, a user may use a drop-down menu (e.g., following a right-click) to select an option to publish the application. In another example, the user may "drag-and-drop," which may comprise the user clicking and dragging an icon corresponding to the application to a visually indicated area for publishing a shortcut. A visual depiction of a "drag-and-drop" may be found, for example, in FIG. 7.

At step 625, the receiver may send an indication of an application selection 625 to the virtual desktop 615. The indication 625 may comprise information from the receiver indicating that the application has been selected to publish a shortcut. For example, the indication 625 may comprise an indication that a given application icon has been selected for publishing. In some instances, the indication 625 may comprise cursor movement and selection information, and other determinations may be made by the virtual desktop 615. For example, the indication 625 may comprise an indication that a "drag-and-drop" has been made from one coordinate to another. The virtual desktop 615 may interpret the indication and determine that the indication 625 indicates that the application has been selected for publishing (e.g., an application icon has been "drag-and-dropped" to a publishing icon).

At step 630, the virtual desktop 615 may determine application information and instance information. Application information may comprise information that indicates an application to be published. For example, application information may comprise an application path, an application icon, run-time parameters for the application, and/or any other such information. In some instances, the application information may comprise information that exists in a local shortcut, such as a Windows application shortcut on the virtual desktop 615. Instance information may comprise information indicating a particular virtual desktop instance where the application is installed. For example, the instance information may comprise an identifier of a particular virtual machine, such as virtual machine 332A. The application information may indicate what application should be run (and potentially how, such as using run-time parameters), and the instance information may indicate what virtual desktop is to be used to run the application. The combination of application information and instance information may allow for a particular installation of an application to be run on a particular machine. For example, the information may indicate a user's personalized instance of a word processor (e.g., which may be indicated by application information) as installed on a particular virtual machine (e.g., which may be indicated by instance information). The application information and instance information may be transmitted to the storefront 610 via an application and instance information message 635.

At step 640, the storefront 610 may publish a shortcut based on the application information and instance information. The shortcut may comprise information relevant to launching an application on a virtual machine (e.g., an application icon for display, an identifier for a virtual machine, a path to the application on the local directory of the virtual machine, etc.). The application may be a virtualized application, such as an application discussed above (e.g., a secure application, a pre-wrapped application 482, or an unwrapped application 480). In some instances, the shortcut may be published by, or in conjunction with, some other piece of software to the storefront 610 (e.g., the storefront 610 may serve as a repository for software published by some other entity, such as the application controller 474).

At step 645 a user may send an input selecting the shortcut at the receiver 605. For example, the user may use a mouse to click on an application icon associated with the storefront 610. In another example, the user may select the shortcut using a receiver 605 that is a mobile device. The receiver 605 may send an indication of the selected shortcut 650. The indication 650 may comprise a message that indicates that the shortcut was selected using an input device associated with the receiver 605.

At step 655, the storefront 610 may begin the process of instantiating the virtualized application. The storefront 610 may generate an ICA file, which may be used to render the virtualized application on the receiver 605. The storefront 610 may execute a script which may initiate execution of the application. For example, the storefront 610 may send information to launch an application 660, which may comprise one or more of an indication that a script should be run on the virtual desktop 615, or information generated by a script executed on storefront 610 that may prompt the virtual desktop 615 to launch the application. At step 665, the virtual desktop 615 may launch an instance of a virtual desktop (e.g., an instance indicated by instance information), consistent with the descriptions herein. At step 670, the virtual desktop 615 may launch an application. The application may be an application indicated by application information, and/or may be an application executing on the virtual desktop 615 for display on the receiver 605. A user of the receiver 605 may interact with the application by using a local render of the application created at step 680 based on virtualization information 675 sent from the virtual desktop 615.

Figure 7:
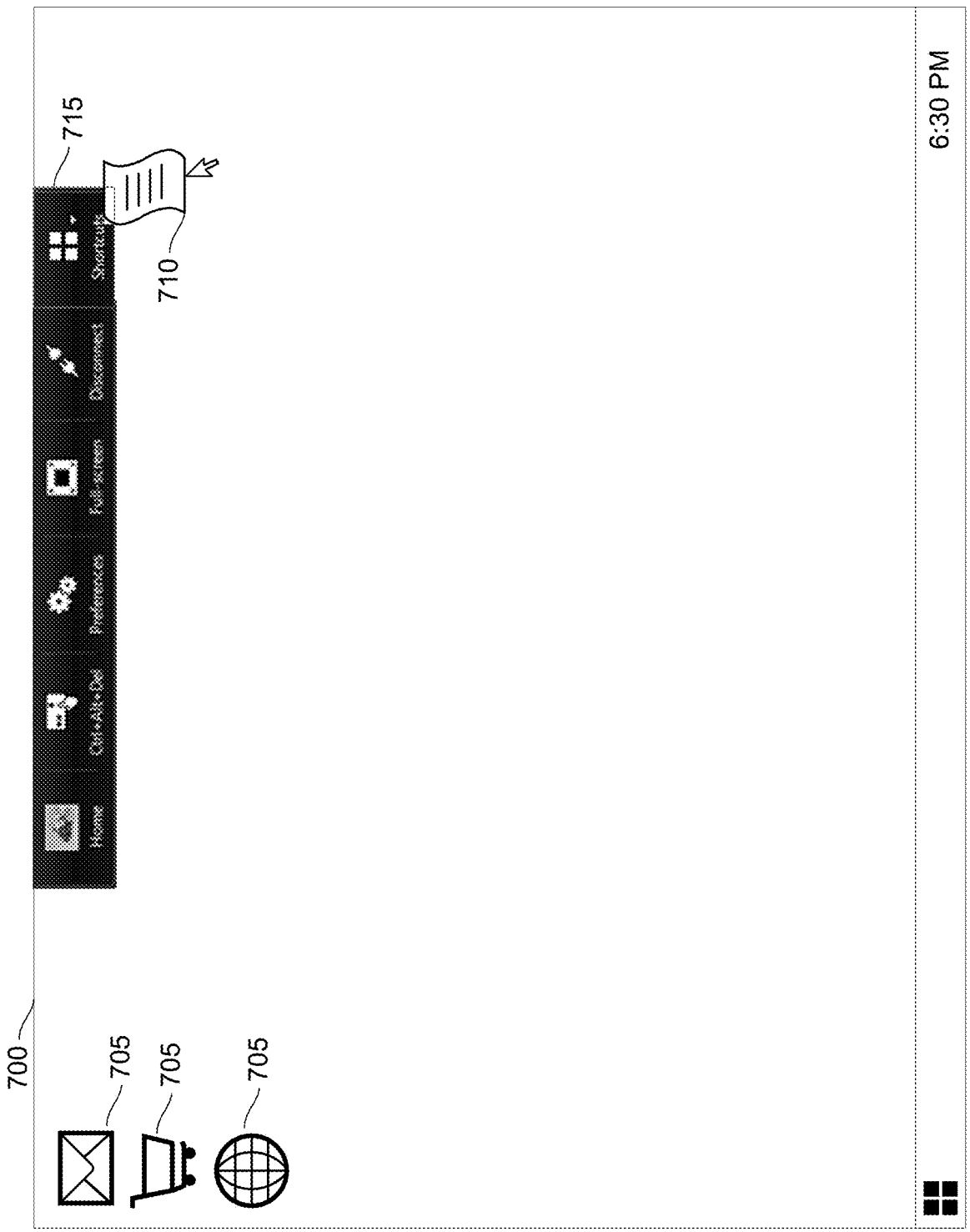
FIG. 7 depicts an illustrative example of a user interface for adding a shortcut for an application.

FIG. 7 depicts an illustrative example of a user interface for adding a shortcut for an application. A desktop 700 may comprise a virtualized instance of a computer desktop. For example, the desktop 700 may comprise a desktop for Windows, Mac, Linux, Chrome OS, etc., that is being rendered on a receiver (e.g., a client device 240). The desktop 700 may comprise a number of different shortcuts 705 to local applications. The desktop 700 may comprise a virtualization interface 715. The virtualization interface 715 may be a displayed set of interface options for various aspects of the virtual desktop. For example, the virtualization interface 715 may comprise an option to send a "ctrl+alt+del" command to the virtual desktop, and an option to make the virtual desktop full screen (e.g., full screen on a local OS of the client device 240). The virtualization interface 715 may also comprise an option for creating a shortcut (e.g., a menu icon for creating a shortcut according to the methods and systems discussed herein, such as may be found in FIGS. 6-8). A user may be permitted to drag a local shortcut 710 for an application to be published to the option on the virtualization interface 715. When the icon for the shortcut 710 is released on the virtualization interface 715, information from the shortcut 710 may be transmitted for publishing. For example, the icon, application path, and/or run-time parameters associated with the shortcut 710 may be transmitted to a server and/or storefront for publishing. This may have the advantage of allowing a user to self-publish an application on a virtual desktop to his or her own personal storefront. The illustration depicted in FIG. 7 is just one example of how application publishing on a desktop may be implemented. For example, a desktop on a mobile device may be touch enabled, icons may be visually different, the desktop may be simplified, there may be no cursor, and/or menus may be adjusted as appropriate for the OS and input methods used.

Figure 8:
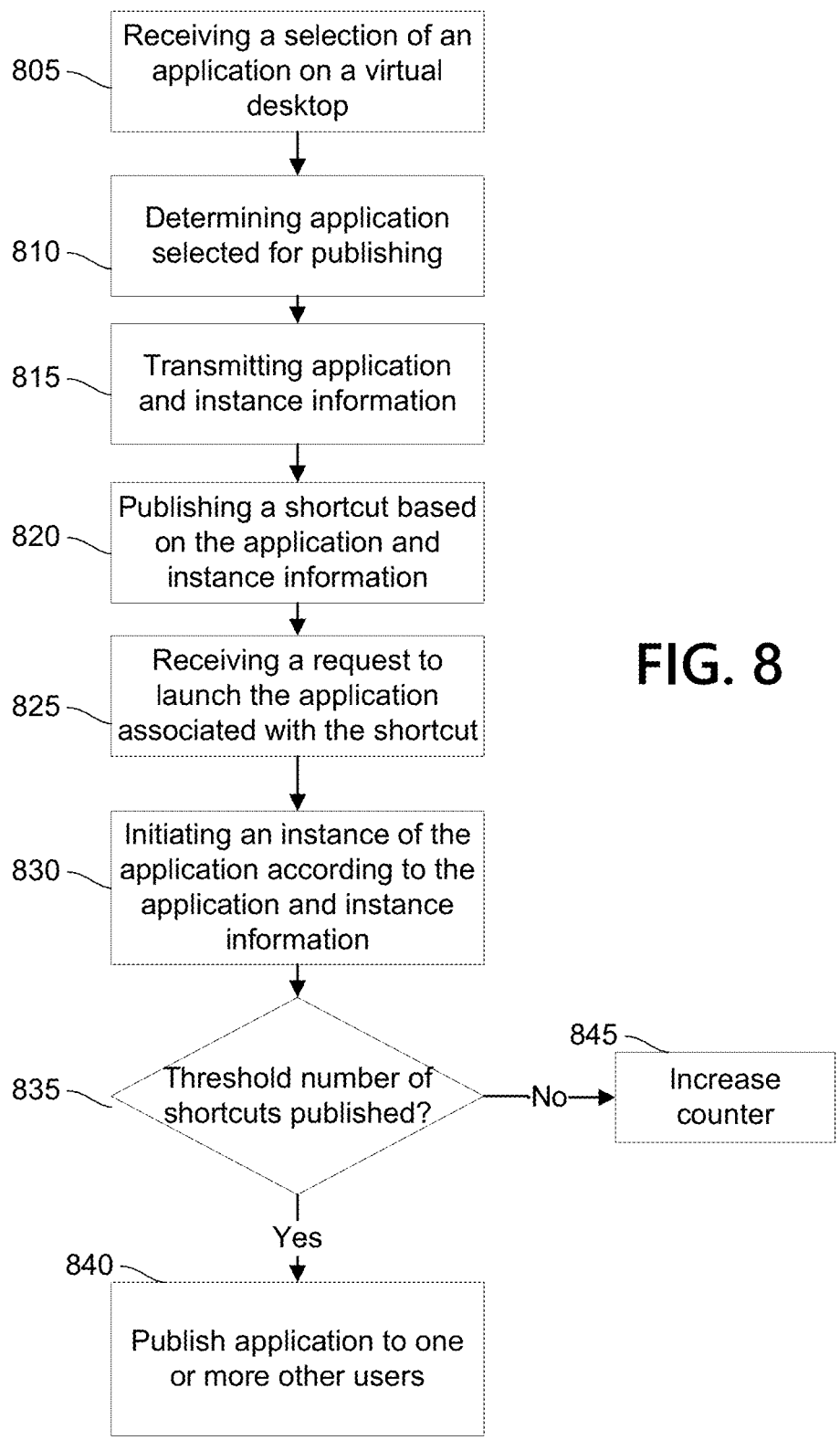
FIG. 8 depicts an illustrative example of a method for self-publishing an application in a virtualization system.

FIG. 8 depicts an illustrative example of a method for self-publishing an application in a virtualization system. A virtualization system may comprise one or more devices implementing remote access to a virtual desktop, such as the systems and methods described herein. A user may access applications on a virtual desktop (e.g., a virtual desktop 615) via a storefront (e.g., a storefront 610), which may be accessed on a user device (e.g., a client device 240 and/or a receiver 605). The applications may launch as a standalone application (e.g., a wrapped application) or may launch as part of a fully rendered desktop (e.g., an unwrapped application). In some instances, applications may be published to a storefront by an IT manager in groups. By allowing a user to self-publish applications on his or her own desktop, the user may be able to add a shortcut to a storefront that may not be available to one or more other users in his or her group.

At step 805, the virtualization system may receive a selection of an application residing on (e.g., installed and/or executing on) a virtual desktop. The selection may comprise an input at a user device that is relayed to the virtual desktop. For example, the selection may comprise a user dragging an icon corresponding to the application over an icon for publishing applications.

At step 810, the virtualization system may determine an application selected for publishing. The virtualization system may detect a command to publish the application based on an input, as may be received in step 805. The virtualization system may then determine application information and instance information corresponding to the application. In some instances, the information may comprise an address or identifier of the application on a given virtual desktop (e.g., an application path name or an application name) In other instances, the address may indicate a machine where the application may be accessed (e.g., an IP address, a media access control address, a virtual desktop identifier). At step 815, the information may be transmitted to a server (e.g., a server managing a storefront of the virtualization system, such as storefront 610) for publishing.

At step 820, the virtualization system may publish the shortcut based on the application. The virtualization system may publish the shortcut by creating a link on a storefront to the application. The link may enable a user to select the application, which may launch the application (e.g., a wrapped application), may initiate a script to launch the application on a virtual desktop (e.g., may launch a virtual desktop, which may then automatically launch the application on the virtual desktop), or may launch a virtual desktop where the application resides (e.g., the user may be directed to a virtual desktop for launching the application manually).

At step 825, the virtualization system may receive a request to launch an application associated with a shortcut. The request may comprise an indication that a user has selected a published shortcut on an application store. For example, a user may select the application from a list of applications on an application store 478 which may be rendered on a mobile device. In another example, a user may select the application from a list of applications on a web page that comprises a storefront. The application may be displayed using an application icon (e.g., an application icon supplied as part of the application information).

At step 830, the virtualization system may initiate an instance of the application according to the application information and instance information. The virtualization system may trigger the execution of a virtual desktop and establish a link between the virtual desktop and a user device (e.g., by generating and/or transmitting an ICA file). In some instances, a script may initiate execution of the application. For example, the virtualization system may execute a script on the virtual desktop that launches an application according to the application information. The virtual desktop may be indicated by instance information (e.g., indicated by an IP address, a media access control address, or a virtual desktop identifier). The application may execute as a wrapped application (e.g., an application wrapped such that it appears to be executing on a user device) or as an application within the interface of the virtual desktop (e.g., as an application executing within a virtual desktop operating system environment). The user may then interact with the application according to the various systems and methods described herein.

In some instances, a system manager may wish to publish an application if the popularity of the application crosses a certain threshold. For example, users may be able to self-publish applications using one or more methods or systems described herein. However, an IT manager may wish to publish an application to a larger group of users if the application is sufficiently popular (e.g., meets or exceeds a threshold). If a certain percentage or amount (e.g., 15% of users in a group, 30 users in a 100 user group, etc.) of users install a given application, this may indicate that the application may be relevant or helpful to that group. Rather than require each user to publish the application themselves, it may be beneficial to automatically publish the application to the storefront when that threshold is reached. This may have the advantage of publishing useful applications without requiring an IT manager to publish the application manually.

At step 835, the virtualization system may determine if a threshold number of shortcuts for an application have been published. The application may be tracked via an application name, an execution identifier (e.g., Windows AppID), application path, or any other suitable method for identifying an application. In some instances, a table may be used to cross-reference identifiers for a given application across various architectures and/or operating systems. If the threshold number of shortcuts have been published, then the virtualization system may publish the application to one or more users in step 840. The one or more users may be defined as a group, which may be a group of users using a set of virtual desktops, or a subset of such a group. Any group of users may be defined.

If a threshold number of shortcuts has not been published, then the system may increase a counter at 845. The counter may be incremented in order to determine when the threshold is reached. The counter may be decremented if a user chooses to remove the shortcut from his or her storefront. An IT manager may also use the counter for heuristics purposes. The counters for one or more applications may be viewable, such that an IT manager can track how many shortcuts for each of the one or more applications have been published, and/or when they were published. This may have the advantage of allowing the IT manager to see what applications have been popular. Based on this information an IT manager may choose to manually publish an application for a group. Further information may also be collected. For example, the virtualization system may track any run-time parameters for published shortcuts. This may allow an IT manager to adjust published shortcuts or installations based on user preferences. An IT manager may also be presented with information indicating how often given applications are launched with a shortcut, in order to determine what applications are most used, when they are used, or any other such information that may be helpful for IT management.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving a user input selecting an icon corresponding to an application installed on a virtual desktop;
   determining that the icon has been repositioned over a shortcut creation icon;
   transmitting, to the virtual desktop and based on the determining, an indication of the selection of the application;
   transmitting, from the virtual desktop and to a storefront, and based on the indication, information comprising application information and instance information for the virtual desktop;
   publishing, on the storefront and based on the information, a shortcut to the application;
   launching, after receiving a selection of the shortcut on the storefront, a virtualized instance of the application;
   increasing, based on the publishing the shortcut, an application publication counter for an application type associated with the application;
   determining whether the application publication counter exceeds a threshold;

determining, based on the application publication counter exceeding the threshold, that a number of published shortcuts for the application type exceeds the threshold; and publishing, based on the number of published shortcuts for the application type exceeding the threshold, one or more other shortcuts corresponding to the application type to one or more other storefronts.

2. The method of claim 1, wherein the application information comprises a path name for the application, wherein the path name comprises a relative path to the application on the virtual desktop.

3. The method of claim 1, wherein the instance information transmitted to the storefront comprises at least one of:
an internet protocol address corresponding to the virtual desktop; or
a media access control address corresponding to the virtual desktop.

4. The method of claim 1, wherein the application information comprises the icon.

5. The method of claim 1, wherein the storefront comprises a plurality of links each corresponding to one of a plurality of virtual desktops, wherein the virtual desktop is one of the plurality of virtual desktops, and wherein the instance information comprises information for the virtual desktop.

6. The method of claim 1, further comprising determining the application information from a local shortcut on the virtual desktop, wherein the icon is associated with the local shortcut.

7. A system comprising:
a receiver executing on one or more computing devices, and
one or more servers;
wherein the receiver is configured to:
receive a user input selecting an icon corresponding to an application installed on a virtual desktop;
determine that the icon has been repositioned over a shortcut creation icon; and wherein the one or more servers are configured to:
transmit, to a storefront and based on the icon being repositioned, information comprising application information and instance information for the virtual desktop;
cause the storefront to publish, based on the information, a shortcut to the application;
launch, after receiving a selection of the shortcut on the storefront, a virtualized instance of the application;
increase, based on publishing the shortcut, an application publication counter for an application type associated with the application;
determine whether the application publication counter exceeds a threshold;
determine, based on the application publication counter exceeding the threshold, that a number of published shortcuts for the application type exceeds the threshold; and
publish, based on the number of published shortcuts for the application type exceeding the threshold, one or more other shortcuts corresponding to the application type to one or more other storefronts.

8. The system of claim 7, wherein the application information comprises a path name for the application, wherein the path name comprises a relative path to the application on the virtual desktop.

9. The system of claim 7, wherein the instance information transmitted to the storefront comprises at least one of:
an internet protocol address corresponding to the virtual desktop; or
a media access control address corresponding to the virtual desktop.

10. The system of claim 7, wherein the application information comprises the icon.

11. The system of claim 7, wherein the storefront comprises a plurality of links each corresponding to one of a plurality of virtual desktops, wherein the virtual desktop is one of the plurality of virtual desktops, and wherein the instance information comprises information for the virtual desktop.

12. The system of claim 7, wherein the one or more servers are configured to determine the application information from a local shortcut on the virtual desktop, wherein the icon is associated with the local shortcut.

13. A method comprising:
receiving, by a virtual desktop and from a receiver, an indication that an application associated with a virtual desktop has been selected for publishing to a storefront;
sending, by a virtual desktop and to a storefront, information comprising application information and instance information for the virtual desktop, wherein the information is based on the indication;
causing the storefront to publish, based on the information, a shortcut to the application, wherein the storefront is assigned to a particular user;
launching, by the virtual desktop and after receiving a selection of the shortcut on the storefront, a virtualized instance of the application;
increasing, based on publishing the shortcut, an application publication counter for an application type associated with the application;
determining whether the application publication counter exceeds a threshold;
determining, based on the application publication counter exceeding the threshold, that a number of published shortcuts for the application type exceeds the threshold; and
publishing, based on the number of published shortcuts for the application type exceeding the threshold, one or more other shortcuts corresponding to the application type to one or more other storefronts.

14. The method of claim 13, wherein the application information comprises a path name for the application, wherein the path name comprises a relative path to the application on the virtual desktop.

15. The method of claim 13, wherein the instance information sent to the storefront comprises at least one of:
an internet protocol address corresponding to the virtual desktop; or
a media access control address corresponding to the virtual desktop.

16. The method of claim 13, wherein the storefront comprises a plurality of links each corresponding to one of a plurality of virtual desktops, wherein the virtual desktop is one of the plurality of virtual desktops, and wherein the instance information comprises information for the virtual desktop.

17. The method of claim 13, further comprising determining the application information from a local shortcut on the virtual desktop.

* * * * *